US010949302B2

(12) United States Patent
Cheung et al.

(10) Patent No.: US 10,949,302 B2
(45) Date of Patent: Mar. 16, 2021

(54) ERASURE-CODING-BASED EFFICIENT DATA STORAGE AND RETRIEVAL

(71) Applicant: PhazrIO Inc., Los Angeles, CA (US)

(72) Inventors: Chi-Kwan Jim Cheung, Santa Monica, CA (US); Lara Dolecek, Los Angeles, CA (US); Gary N. Jin, Portland, OR (US); Juo-Yu Lee, Westlake Village, CA (US)

(73) Assignee: PhazrIO Inc., Camarillo, CA (US)

( * ) Notice: Subject to any disclaimer, the term of this patent is extended or adjusted under 35 U.S.C. 154(b) by 128 days.

(21) Appl. No.: 16/155,578

(22) Filed: Oct. 9, 2018

(65) Prior Publication Data

US 2019/0108096 A1 Apr. 11, 2019

Related U.S. Application Data

(60) Provisional application No. 62/570,018, filed on Oct. 9, 2017.

(51) Int. Cl.
G06F 11/00 (2006.01)
G06F 11/10 (2006.01)
G06F 3/06 (2006.01)

(52) U.S. Cl.
CPC .......... *G06F 11/1076* (2013.01); *G06F 3/064* (2013.01); *G06F 3/067* (2013.01); *G06F 3/0619* (2013.01)

(58) Field of Classification Search
None
See application file for complete search history.

(56) References Cited

U.S. PATENT DOCUMENTS

| 10,608,784 | B2* | 3/2020 | Yanovsky | G06F 21/6218 |
| 2015/0095747 | A1* | 4/2015 | Tamo | H03M 13/151 |
| | | | | 714/781 |
| 2015/0142863 | A1* | 5/2015 | Yuen | H03M 13/13 |
| | | | | 707/827 |
| 2017/0255519 | A1* | 9/2017 | Zhang | H04L 67/1097 |
| 2017/0272100 | A1* | 9/2017 | Yanovsky | H04L 67/1097 |

OTHER PUBLICATIONS

Y. S. Han, H. Pai, R. Zheng and W. H. Mow, "Efficient Exact Regenerating Codes for Byzantine Fault Tolerance in Distributed Networked Storage," in IEEE Transactions on Communications, vol. 62, No. 2, pp. 385-397, Feb. 2014, doi: 10.1109/TCOMM. 2013.122313.130492. (Year: 2014).*

* cited by examiner

*Primary Examiner* — Daniel F. McMahon
(74) *Attorney, Agent, or Firm* — Shun Yao; Park, Vaughan, Fleming & Dowler LLP

(57) ABSTRACT

One embodiment provides a system that facilitates efficient storage and retrieval using erasure coding. During operation, the system determines a finite field solution that conforms to both locality and maximum distance separable (MDS) properties of an erasure-coding system. The system determines a generator matrix of the erasure-coding system based on the finite field solution and generates, from a data element, a plurality of coded fragments based on the generator matrix of the erasure-coding system. The plurality of coded fragments includes a set of enhanced coded fragments that allows reconstruction of the data element and a set of regular coded fragments. The number of the enhanced coded fragments can be fewer than a threshold number of coded fragments for the erasure-coding system.

20 Claims, 11 Drawing Sheets

ERASURE-CODING-BASED EFFICIENT DATA STORAGE AND RETRIEVAL

RELATED APPLICATIONS

This application claims the benefit of U.S. Provisional Application No. 62/570,018, titled "Method and System for Optimizing Data Decoding using Intrinsic Locality Properties of Finite Fields," by inventors Chi-Kwan Jim Cheung, Lara Dolecek, Gary N. Jin, and Juo-Yu Lee, filed 9 Oct. 2017, the disclosure of which is incorporated by reference herein.

The present disclosure is related to U.S. patent application Ser. No. 15/721,329, titled "Integrated Security and Data Redundancy," by inventors Donald C. D. Chang, Chi-Kwan Jim Cheung, Lara Dolecek, Gary N. Jin, and Rocky Chi-Ray Lin, filed 29 Sep. 2017, the disclosure of which is incorporated by reference herein.

BACKGROUND

Field

This disclosure is generally related to data redundancy. More specifically, this disclosure is related to a method and system for facilitating erasure-coding-based data redundancy with efficient data retrieval.

Related Art

With the advancement of computer and network technologies, various operations performed by users of different applications have led to extensive use of web services. This proliferation of the Internet and Internet-based user activity continues to create a vast amount of digital data. For example, users may both generate and access data via different applications, such as mobile applications running on different platforms, as well as web-interfaces running on different browsers in different operating systems. For example, users can create documents that may need secured access from different devices.

To ensure safety, typically multiple copies of such data are stored in the cloud (e.g., on a large storage system in a data center). For example, a large storage system relies on making at least three copies of the data in separate physical locations (e.g., in separate physical devices). This process of replication ensures high availability. To improve storage efficiency and reliability, high availability to data is often provided using erasure coding. Storage systems based on erasure coding (which can be referred to as erasure-coded systems) can provide higher tolerance of failure incidents than typical replication-based techniques, while using less storage. Erasure codes are commonly used today in large storage systems for improved performance.

Typically, erasure-coded systems are implemented using Reed-Solomon coding. For example, Reed-Solomon coding is used to implement erasure coding in many large-scale storage systems. Reed-Solomon coding encodes input data with k symbols into n coded fragments. One of the key properties of such an (n, k) Reed-Solomon coding is that the coded fragments are maximum distance separable (MDS). Therefore, the k coded fragment together with the n coded fragment is sufficient to decode the input data. The MDS property of erasure coding determines the size of a respective coded fragment compared to the input data. For example, in a (6, 4) system, the input data is encoded and stored in coded fragments in such a way that the stored data is 1.5 times the size of the input data. In this way, the MDS property determines the storage efficiency of erasure coding.

Although erasure coding is available for efficient storage, some problems still remain in the efficient retrieval of input data while maintaining the MDS property.

SUMMARY

One embodiment provides a system that facilitates efficient storage and retrieval using erasure coding. During operation, the system determines a finite field solution that conforms to both locality and maximum distance separable (MDS) properties of an erasure-coding system. The system determines a generator matrix of the erasure-coding system based on the finite field solution and generates, from a data element, a plurality of coded fragments based on the generator matrix of the erasure-coding system. The plurality of coded fragments includes a set of enhanced coded fragments that allows reconstruction of the data element and a set of regular coded fragments. The number of the enhanced coded fragments can be fewer than a threshold number of coded fragments for the erasure-coding system.

In a variation on this embodiment, the system determines the finite field solution by determining a set of elements of the finite field solution that conforms to the locality properties and determining the finite field solution based on the set of elements such that the erasure-coding system conforms to the MDS properties.

In a further variation, the system determines the set of elements by obtaining a generator matrix and a base equation associated with the erasure-coding system and generating a set of equations based on known solutions associated with the generator matrix. The system further calculates a set of primitive elements of the finite field solution based on the base equation in such a way that the set of primitive elements conforms to the locality properties.

In a further variation, the system further determines the set of elements further by storing the set of primitive elements in a data structure in a memory device of the local computer system and realigning the set of primitive elements in the memory device to reduce a number of equations of the finite field solution.

In a variation on this embodiment, the system obtains the enhanced coded fragments from corresponding storage devices and, upon successfully obtaining the enhanced coded fragments, reconstructs the data element from the enhanced coded fragments.

In a further variation, the system determines that a subset of the enhanced coded fragments is unavailable. The system then obtains a subset of the regular coded fragments from corresponding storage devices and reconstructs the data element from the available enhanced coded fragments and the obtained regular coded fragments.

In a further variation, the system determines a number of the obtained regular coded fragments based on the subset of the unavailable enhanced coded fragments.

In a further variation, the system generates a decoder matrix, which is an inverted matrix of a sub-matrix of the generator matrix, based on the enhanced coded fragments. The system then obtains the data element based on one or more matrix operations between the decoder matrix and the enhanced coded fragments.

BRIEF DESCRIPTION OF THE FIGURES

In the figures, like reference numerals refer to the same figure elements.

DETAILED DESCRIPTION

Figure 1A:
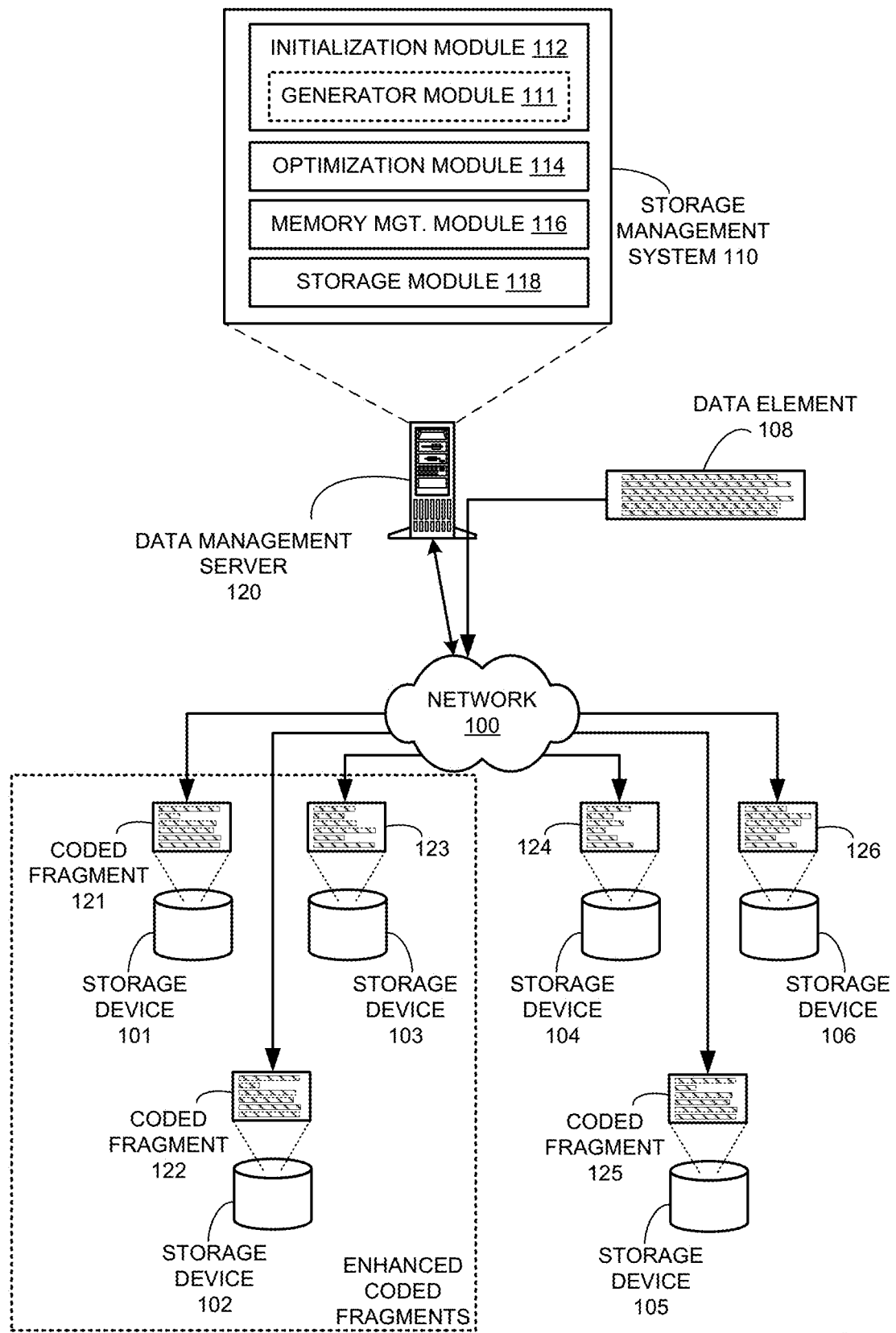
FIG. 1A illustrates an exemplary storage management system facilitating efficient storage and retrieval using erasure coding, in accordance with an embodiment described herein.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments described herein solve the problem of integrating efficient storage and retrieval of data in an erasure-coding-based storage system by (i) incorporating the properties of locality into erasure coding, thereby reducing the number of coded fragments needed to decode and retrieve a data element; and (ii) maintaining the properties of MDS for the erasure coding, thereby ensuring storage efficiency.

Due to ease of access via the Internet, a large number of users generate and access digital data. To ensure secured high availability of data, typically multiple copies of the data are stored in a storage system. If one copy of the data becomes unavailable (e.g., the storage device storing the copy fails), the system can still provide the data to the user from another copy of the data. With existing technologies, erasure coding can be used to provide high availability with a lower storage requirement than typical replication-based techniques. Erasure coding performs encoding on the data to generate a number of coded fragments. A subset of the coded fragments can be used to retrieve the original data. As a result, even if one or more of the coded fragments becomes unavailable, the system can retrieve the original data. For example, in a (6, 4) erasure-coding-based storage system, the original data is encoded into six coded fragments. The system can use any four of the coded fragments to retrieve the original data.

However, since erasure coding requires computation of the data during storage and access, retrieving a data element from erasure-coding-based storage systems is usually slower than traditional replication-based systems. Furthermore, even with specialized hardware instructions (e.g., an Operational Code or OpCode) for computing erasure codes, such systems are still slower than replication-based systems. As a result, erasure-coding-based systems may cause a relatively slower data retrieval. Therefore, such systems are typically used for archival purposes that can tolerate the slower data retrieval. To improve the efficiency of the data retrieval process, locally reparable erasure coding incorporates the properties of locality codes and reduces the number of coded fragments needed to decode a data element (i.e., the input data). But this may result in the erasure coding not conforming to the properties of MDS. As a result, the amount of data stored by the erasure coding increases, and hence, the storage efficiency diminishes.

To solve this problem, embodiments described herein provide a storage management system that facilitates efficient data retrieval while preserving the properties of MDS. If the system is a (n, k) erasure-coding-based storage system, the system can use the properties of locality to generate n coded fragments of a data element using finite field (e.g., Galois field). Here, k can be a threshold number of coded fragments for the erasure-coding-based storage system that allows the reconstruction of a data element. These n coded fragments can include m (m<k) coded fragments with enhanced locality, which can be referred to as enhanced coded fragments. These m coded fragments allow the system to retrieve the data element with fewer than k coded fragments. For example, if the system is a (6, 4) erasure-coding system, the total number of coded fragments needed for the retrieval can be 3. This retrieval process includes obtaining the coded fragments and reconstructing the data element using the obtained coded fragments using extensive computations. Hence, reducing the number of coded fragments needed for the retrieval improves the network performance and reduces the computational overhead.

In addition, the system also maintains the properties of MDS to generate the coded fragments. As a result, the size of each of the coded fragments can remain similar to a regular erasure-coding system. In other words, the system can utilize the properties of locality of the coded fragments for efficient retrieval of the data element without significantly increasing the sizes of the coded fragments. Furthermore, if any of the enhanced coded fragments becomes unavailable, the system can still retrieve the data by obtaining other non-locality coded fragments, which can be referred to as regular coded fragments. For a (6, 4) erasure-coding system, as long as the system can obtain four error-free coded fragments, the system can reconstruct the data element. In this way, the system uses two classes of coded fragments, which are enhanced and regular coded fragments, to maintain the properties of MDS that allow protection and error correction.

To incorporate the properties of locality, the system determines a base equation (e.g., a primitive polynomial) and determines the configuration associated with a (n, k)

erasure-coding system. The system also obtains a generator matrix that represents the (n, k) erasure-coding system and generates a set of equations based on the known solutions associated with the generator matrix. Using the base equation, the system calculates the primitive elements. The system can determine the elements of the finite field that adhere to the properties of locality. To facilitate erasure coding, the system then generates a set of N equations with N unknown values and represents the set of equations, especially the symbols, as elements in a data structure in the memory of a computing device hosting the system. This generates a finite field solution set that incorporates the properties of locality.

The system then traverses the solution set to determine the solutions that maintain the properties of MDS of the system. In other words, the system determines the locality constraints applicable to the elements of the finite field such that the resultant erasure coding conforms to the properties of MDS. In this way, the system can facilitate erasure coding with properties of both locality and MDS. In some embodiments, to further improve the efficiency of the erasure coding, the system can change the alignments of the symbols in the equations through one or more computational operations to the elements represented in the memory. Examples of the computational operations include, but are not limited to, shift, summation, division, and multiplication. The system ensures that the aligned equations conform to properties of both locality and MDS. The system then determines a new generator matrix based on the new finite field elements defined in the aligned equations. Based on the new generator matrix, the system can also determine the encoder and decoder matrices for erasure coding.

Although the present disclosure is presented using examples based on a single data element, the system is not limited to a single data element. The system can apply these operations to multiple data elements in parallel. However, the present disclosure presents the operations with a single data element for exemplifying the integration of properties of locality and MDS.

Storage Management System

FIG. 1A illustrates an exemplary storage management system facilitating efficient storage and retrieval using erasure coding, in accordance with an embodiment described herein. In this example, a data management server 120 is coupled to a network 100. Server 120 can be a physical or a virtual device. Network 100 can be a local or a wide area network, or the Internet. Network 100 can also be a data center network operating in a data center distributed across one or more geographic locations. Server 120 hosts a storage management system 110, which performs erasure coding to facilitate high availability to one or more data elements.

Erasure coding can be systematic and non-systematic. Systematic erasure codes store original data bits separately from parity bits. The data bits are in plaintext and can be accessed without decoding. The parity bits are used to recover the original data bits in an event of data corruption. On the other hand, non-systematic erasure codes combine original data and parity data as encoded bits. This provides implicit data security by avoiding data in plaintext. Non-systematic erasure codes are generally slower than systematic codes for access operations.

Server 120 can facilitate specialized hardware instructions for computing erasure codes. Examples of such instructions include, but are not limited to, Single Instruction Multiple Data (SIMD) and Advanced Vector Extensions, such as AVX, AVX2, etc. These instructions can allow server 120 to manipulate large data vectors with a smaller number of instructions and accelerate computation associated with Galois field arithmetic. With existing technologies, even with such hardware support, system 110 may still operate more slowly than traditional replication-based systems. To facilitate erasure coding, system 110 can perform encoding on a data element 108 to generate a number of coded fragments. A subset of the coded fragments can be used to retrieve original data element 108. As a result, even if one or more of the coded fragments becomes unavailable, system 110 can retrieve the original data.

For example, if system 110 is a (6, 4) erasure-coding-based storage system, data element 108 can be encoded into six coded fragments 121, 122, 123, 124, 125, and 126. System 110 can use any four of these coded fragments to retrieve data element 108. However, since erasure coding requires computation of the data during storage and access, retrieving data element 108 from at least four of coded fragments 121, 122, 123, 124, 125, and 126 can be slower than traditional replication-based systems. As a result, system 110 may cause a relatively slower data retrieval. To improve the efficiency of the data retrieval process, incorporating the properties of locality can reduce the number of coded fragments needed to decode data element 108. However, this may result in the erasure coding not conforming to the properties of MDS. As a result, the amount of data stored in each of coded fragments 121, 122, 123, 124, 125, and 126 increases and, hence, the storage efficiency diminishes.

To solve this problem, embodiments described herein allow system 110 to facilitate efficient data retrieval while preserving the properties of MDS. If system 110 is a (6, 4) system, system 110 can use the properties of locality to generate six coded fragments 121, 122, 123, 124, 125, and 126 from data element 108 using finite field (e.g., Galois field). System 110 can distribute coded fragments 121, 122, 123, 124, 125, and 126 via network 100 and store them in storage devices 101, 102, 103, 104, 105, and 106, respectively. It should be noted that storage devices 101, 102, 103, 104, 105, and 106 can be at the same location or in different geographic locations. Coded fragments 121, 122, 123, 124, 125, and 126 can also be stored in a same storage device. Examples of a storage device include, but are not limited to, cloud storage, a hard disk drive (HDD), a solid-state drive (SSD), and a flash memory.

System 110 can generate coded fragments 121, 122, 123, 124, 125, and 126 in such a way that they can include at least 3 coded fragments 121, 122, and 123 with enhanced locality, which can be referred to as enhanced coded fragments. Enhanced coded fragments 121, 122, and 123 allow the system to retrieve the data element with fewer than four coded fragments. In addition, system 110 also maintains the properties of MDS to generate coded fragments 121, 122, 123, 124, 125, and 126. As a result, the size of each of these coded fragments can remain similar to a regular erasure-coding system. In other words, system 110 can use the properties of locality of coded fragments 121, 122, and 123 for efficient retrieval of data element 108 without significantly increasing the sizes of coded fragments 121, 122, 123, 124, 125, and 126.

To efficiently retrieve data element 108, a user device obtains coded fragments 121, 122, and 123 via network 100, and reconstructs data element 108 using obtained coded fragments 121, 122, and 123 using extensive computations. Hence, the benefit of reducing the number of coded fragments while maintaining the properties of MDS is twofold. First, a smaller number of coded fragments reduces the data transportation overhead for network 100. For example, it can lower the bandwidth usage of network 100 since a smaller number of coded fragments, which have not significantly increased in size due to the conformity of the properties of MDS, is transported via network 100. Second, the extensive computations performed to reconstruct data element 108 are also reduced since the computations are performed on three coded fragments instead of four.

Furthermore, if any of enhanced coded fragments 121, 122, and 123 becomes unavailable, system 110 can still retrieve data element 108 by obtaining other regular coded fragments. For a (6, 4) system, as long as system 110 can obtain four error-free coded fragments, system 110 can reconstruct data element 108. In this way, system 110 uses two classes of coded fragments, which are enhanced coded fragments 121, 122, and 123, and regular coded fragments 124, 125, and 126, to maintain the properties of MDS that allow protection and error correction.

In some embodiments, system 110 can include an initialization module 112, optimization module 114, memory management module 116, and storage module 118. Using these modules, system 110 facilitates write, read, obfuscation, and fault tolerance capabilities of a storage system using matrix operations while adhering to the properties of locality and MDS. During operation, initialization module 112 can determine a generator matrix and a base equation. In some embodiments, initialization module 112 further includes a generator module 111 that determines a set of primitive elements using the properties of locality from the generator matrix and the base equation. Optimization module 114 can further optimize the primitive elements of the finite field such that the output structure conforms to the properties of MDS. This allows system 110 to use the resultant erasure coding to generate coded fragments that conform to both properties of locality and MDS.

Memory module 116 can perform realignment of the output structure in the memory such that the number of equations are further reduced. In some embodiments, memory module 116 can organize the output structure with XOR, shift, and substitution operations in such a way that the data is obfuscated as the data is read into memory. Memory module 116 can also organize the output structure to reduce the number of shift operations that could be needed for the matrix operations to produce the coded fragments. These shift and substitution operations may be applicable to one or more bytes of the output structure (e.g., a byte), or single or multiple rows and/or columns of the output structure. System 110 can predetermine the XOR, shift, and substitution operations based on the sizes of the input data and the generator matrix, or can deterministically calculate the operations at runtime. Based on the realignment, memory module 116 generates a new generator matrix.

Storage module 118 uses the new generator matrix to obtain encoder and decoder matrices. Using the new generator matrix, storage module 118 can generate coded fragments 121, 122, 123, 124, 125, and 126 from data element 108, and stores the coded fragments in storage devices 101, 102, 103, 104, 105, and 106, respectively. Storage module 118 can also generate the decoder matrix to retrieve data element 108 from enhanced coded fragments 121, 122, and 123. If unsuccessful, storage module 118 can also generate the decoder matrix to retrieve data element 108 from other coded fragments such that at least k error-free coded fragments (in this example, k=4) are obtained and decoded.

Figure 1B:
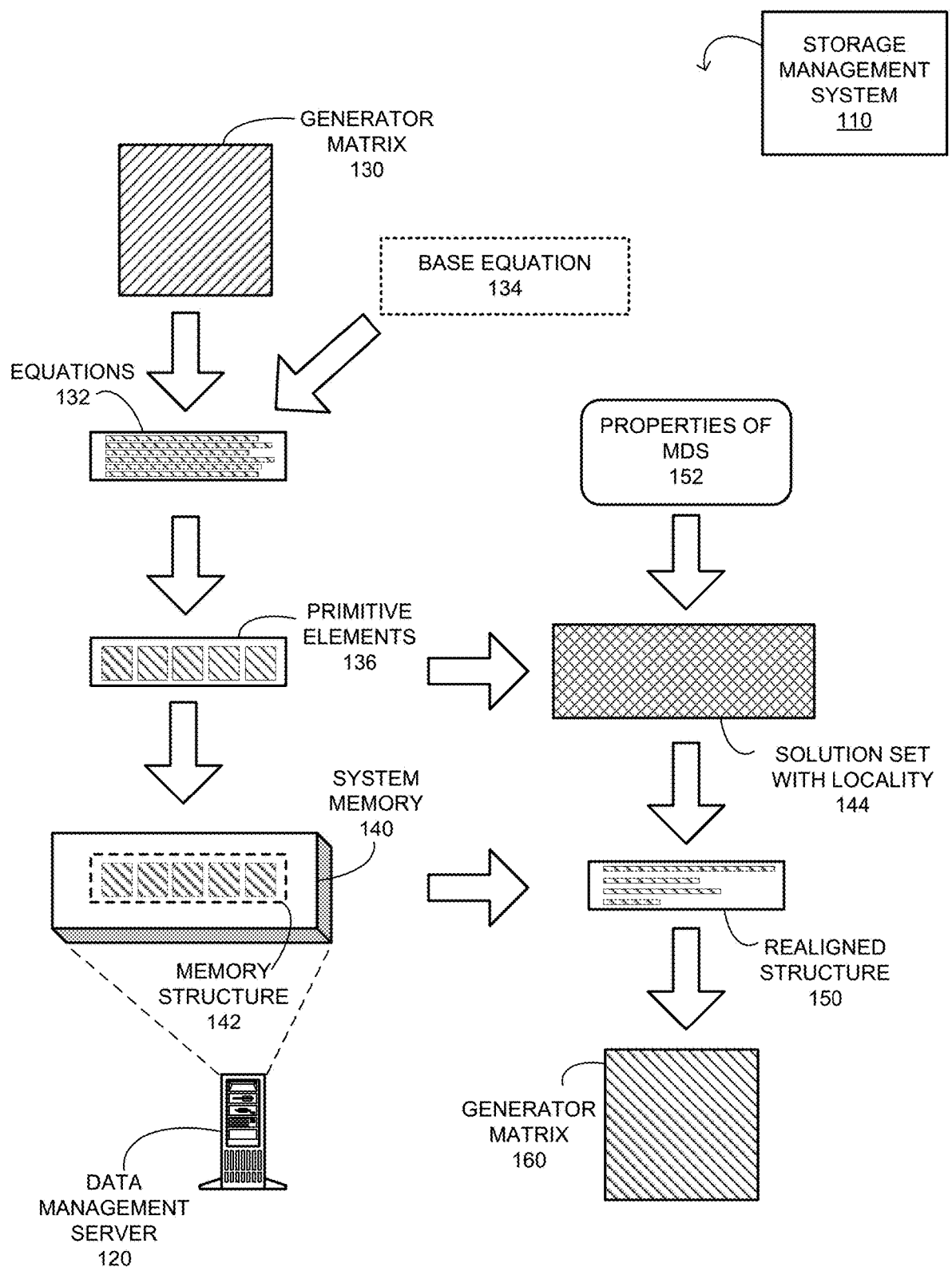
FIG. 1B illustrates an exemplary incorporation of locality and MDS properties in erasure coding, in accordance with an embodiment described herein.

FIG. 1B illustrates an exemplary incorporation of locality and MDS properties in erasure coding, in accordance with an embodiment described herein. To incorporate the properties of locality, system 110 can determine a base equation 134 (e.g., a primitive polynomial) and determines the configuration associated with a (n, k) erasure-coding system. System 110 also obtains a generator matrix 130 that represents the (n, k) erasure-coding system. In some embodiments, system 110 obtains generator matrix 130 and base equation 134 from a user (e.g., via a user interface). System 110 generates a set of equations 132 based on the known solutions associated with generator matrix 130. Using base equation 134, system 110 calculates primitive elements 136. System 110 can determine primitive elements 136, which are the symbols, of the finite field in such a way that they adhere to the properties of locality.

To facilitate erasure coding, system 110 then generates a set of N equations with N unknown values and represents primitive elements 136, as elements in a memory structure 142 in system memory 140 of data management server 120. This generates a finite field solution set 144 that incorporates the properties of locality. System 110 then traverses solution set 144 to determine the solutions that maintain properties of MDS 152 of an (n, k) erasure-coding system. In other words, system 110 determines the locality constraints applicable to primitive elements 136 of the finite field such that the resultant erasure coding conforms to properties of MDS 152. In this way, system 110 can facilitate erasure coding with properties of both locality and MDS. In some embodiments, to further improve the efficiency of the erasure coding, system 110 can change the alignments of the symbols in the equations to generate a realigned structure 150.

System 110 can use one or more computational operations to primitive elements 136 represented in memory structure 142 to generate realigned structure 150. Examples of the computational operations include, but are not limited to, shift, summation, division, and multiplication. System 110 ensures that the realigned equations in realigned structure 150 conform to properties of both locality and MDS. System 110 then determines a new generator matrix 160 based on the new finite field elements defined in the realigned equations in realigned structure 150. Based on new generator matrix 160, system 110 can also determine the encoder and decoder matrices for erasure coding.

Figure 1C:
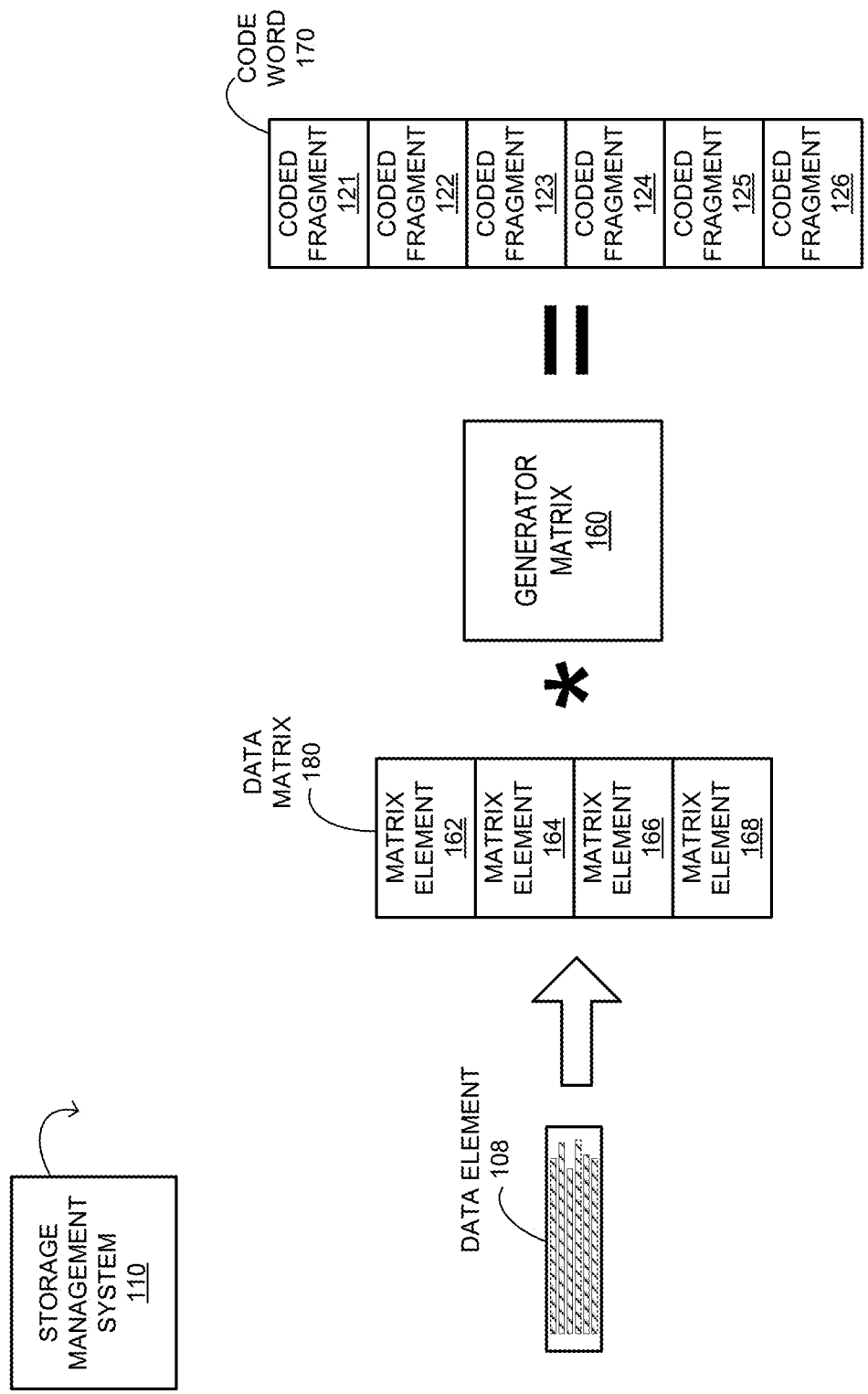
FIG. 1C illustrates an exemplary generation of coded fragments using erasure coding, in accordance with an embodiment described herein.

FIG. 1C illustrates an exemplary generation of coded fragments using erasure coding, in accordance with an embodiment described herein. During operation, system 110 can obtain another data element 108. In some embodiments, system 110 can obtain multiple data elements and generate coded fragments from multiple data elements in parallel. System 110 can transform a part of data element 108 to a matrix element 162 by representing the bytes in that part in real numbers, such as integers and floating points, or as linear equations, such as Galois field equations. Matrix element 162 may include additional bytes than the part of data element 108 to optimize and facilitate the erasure coding process. In the same way, system 110 generates matrix elements 164, 166, and 168 from data element 108. System 110 then forms a data matrix 180 comprising matrix elements 162, 164, 166, and 168.

System 110 then obtains generator matrix 160. In some embodiments, the number of matrix elements in data matrix 180 can be determined by the dimension of generator matrix 160 such that data matrix 180 and generator matrix 160 can be multiplied. For example, if the number of coded fragments to be generated is six and the minimum number of coded fragments needed to recover the data elements is four, generator matrix 160 should be a 4-by-6 matrix. Under such circumstances, data matrix 180 should be a 1-by-4 matrix. System 110 then multiplies data matrix 180 and generator matrix 160 to generate code word 170, which includes coded fragments 121, 122, 123, 124, 125, and 126. System 110 may use a subset of these coded fragments to recover data element 108.

Incorporation of Locality and MDS

Figure 2A:
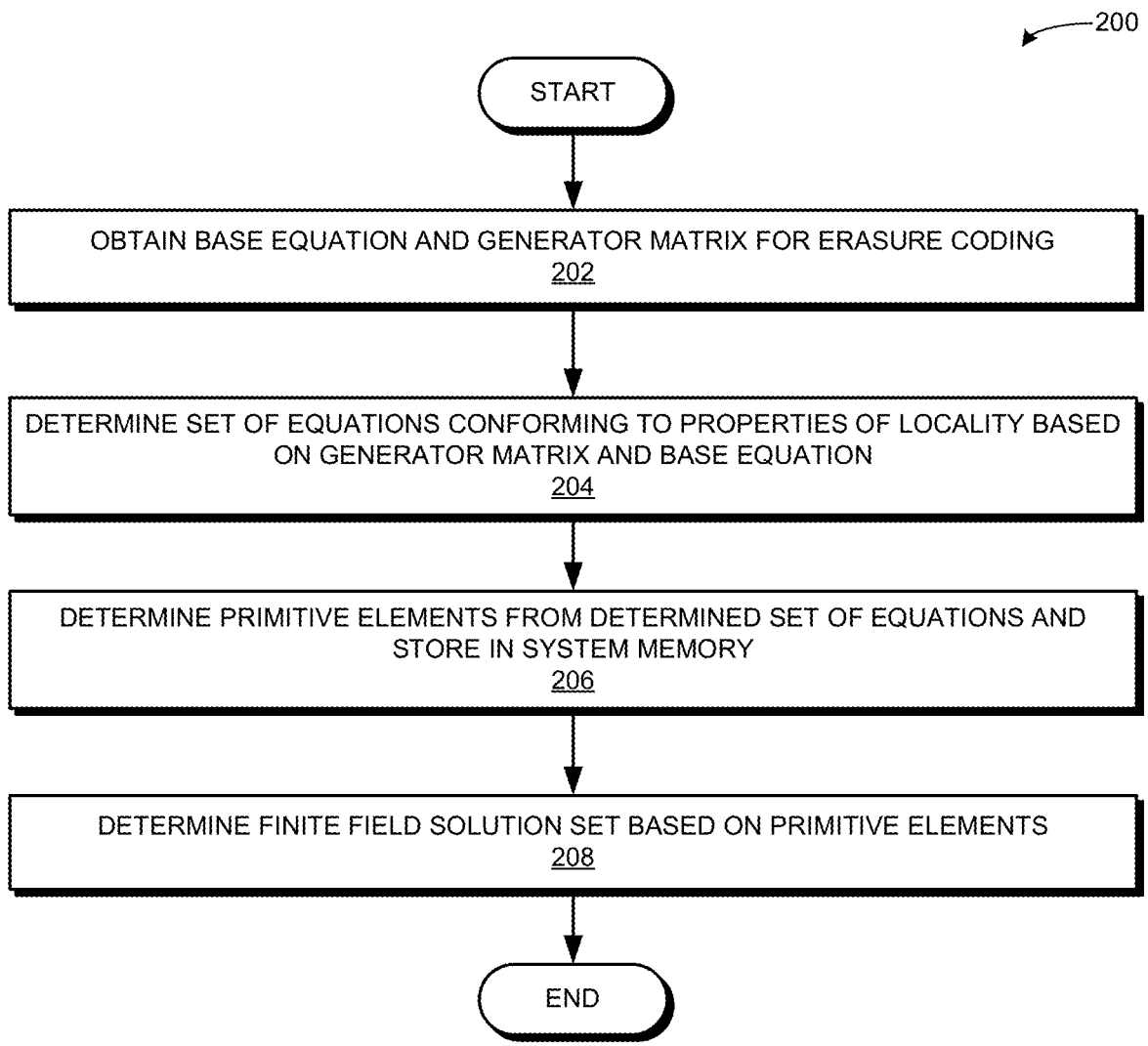
FIG. 2A presents a flowchart illustrating a method for incorporating the properties of locality into erasure coding, in accordance with an embodiment described herein.

FIG. 2A presents a flowchart 200 illustrating a method for incorporating the properties of locality into erasure coding, in accordance with an embodiment described herein. During operation, a storage management system obtains a base equation and a generator matrix for erasure coding (operation 202). The system determines a set of equations conforming to the properties of locality based on the generator matrix and the base equation (operation 204) and determines the primitive elements from the determined set of equations and stores in the system memory (operation 206). The system then determines a finite field solution set based on the primitive elements (operation 208).

Figure 2B:
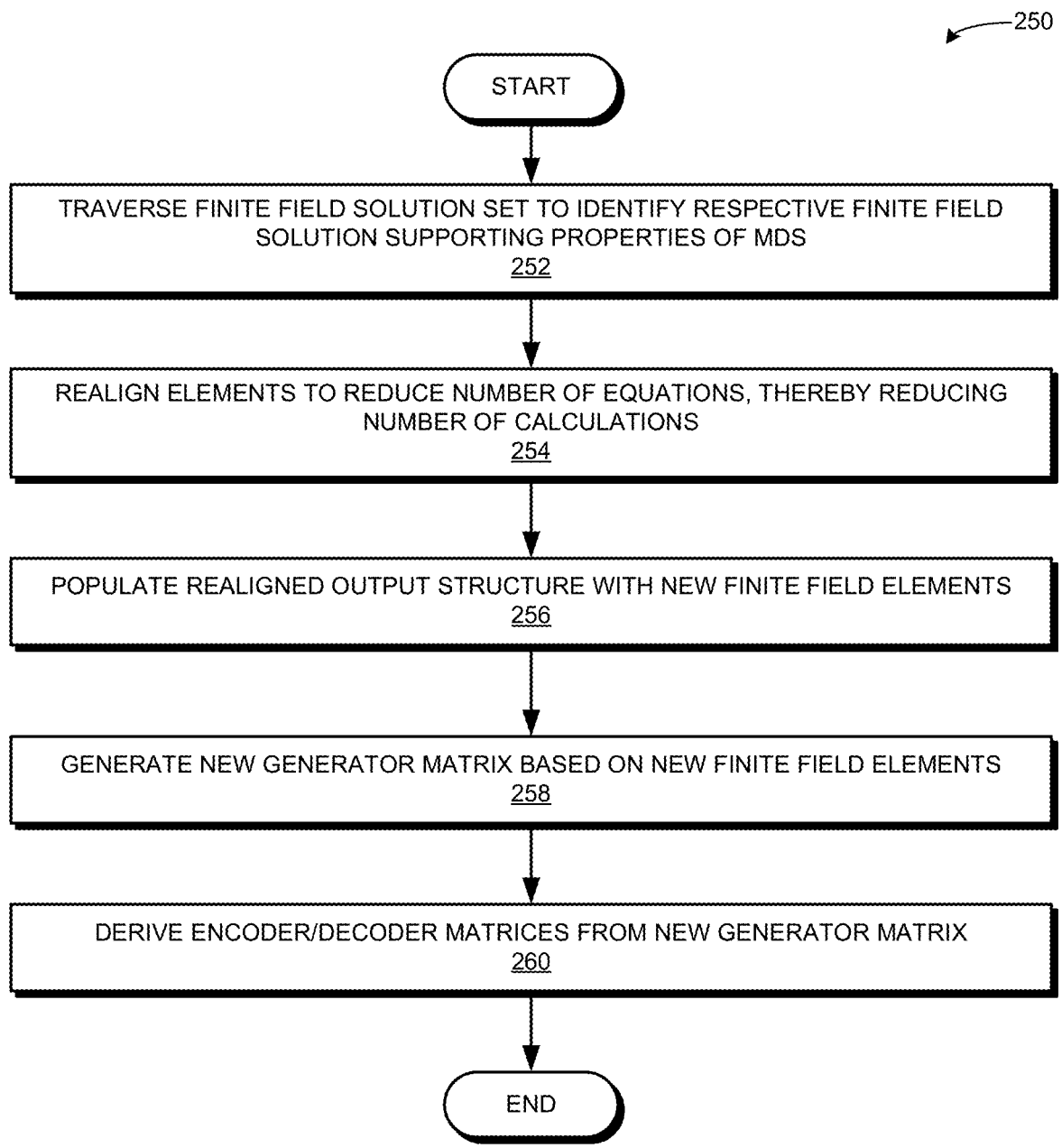
FIG. 2B presents a flowchart illustrating a method for further incorporating the properties of MDS into erasure coding, in accordance with an embodiment described herein.

FIG. 2B presents a flowchart 250 illustrating a method for further incorporating the properties of MDS into erasure coding, in accordance with an embodiment described herein. During operation, a storage management system traverses the finite field solution set to identify respective finite field solution supporting the properties of MDS (operation 252). The system realigns elements to reduce the number of equations, thereby reducing the number of calculations (operation 254). The system populates a realigned output structure with new finite field elements (operation 256) and generates a new generator matrix based on the new finite field elements (operation 258). The system then derives encoder/decoder matrices from the new generator matrix (operation 260).

Data Retrieval

Figure 3A:
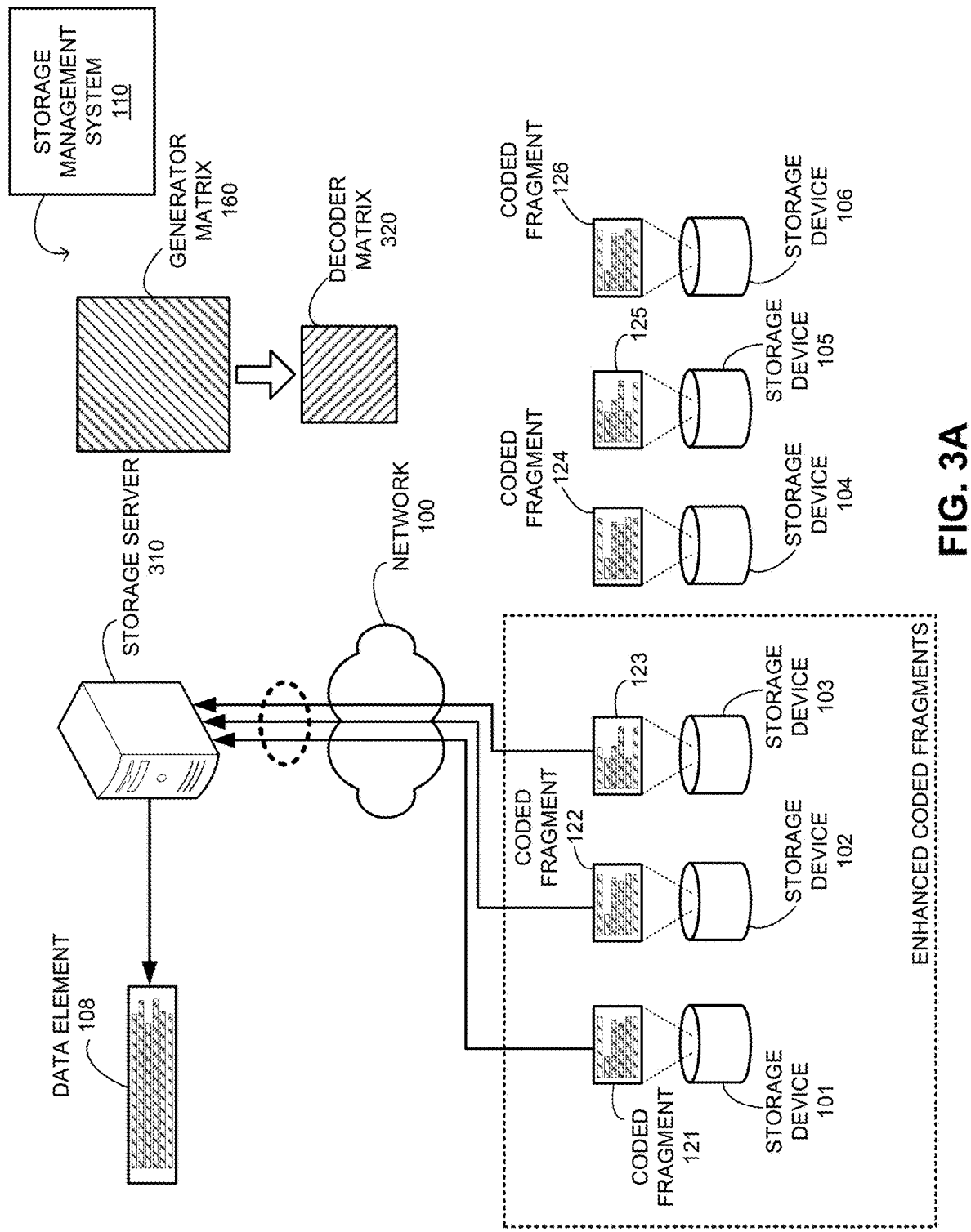
FIG. 3A illustrates an exemplary data retrieval process for erasure coding based on the properties of localization, in accordance with an embodiment described herein.

FIG. 3A illustrates an exemplary data retrieval process for erasure coding based on the properties of localization, in accordance with an embodiment described herein. To efficiently retrieve data element 108, a storage server 310 obtains enhanced coded fragments 121, 122, and 123 via network 100 from storage devices 101, 102, and 103, respectively. Server 310 can generate a decoder matrix 320 from generator matrix 160 corresponding to coded fragments 121, 122, and 123. Decoder matrix 320 can be an inverted matrix of a sub-matrix of generator matrix 160. Server 310 can obtain a decoder matrix 320 by inverting a sub-matrix, which corresponds to coded fragments 121, 122, and 123, of generator matrix 160.

Server 310 can reconstruct data element 108 based on obtained coded fragments 121, 122, and 123 using decoder matrix 320 (e.g., by performing one or more matrix operations between decoder matrix 320 and enhanced coded fragments 121, 122, and 123). By obtaining three coded fragments instead of four, server 310 can lower the bandwidth usage of network 100 since a smaller number of coded fragments are transported via network 100. The extensive computations performed to reconstruct data element 108 are also reduced since the computations are performed on three coded fragments instead of four.

Figure 3B:
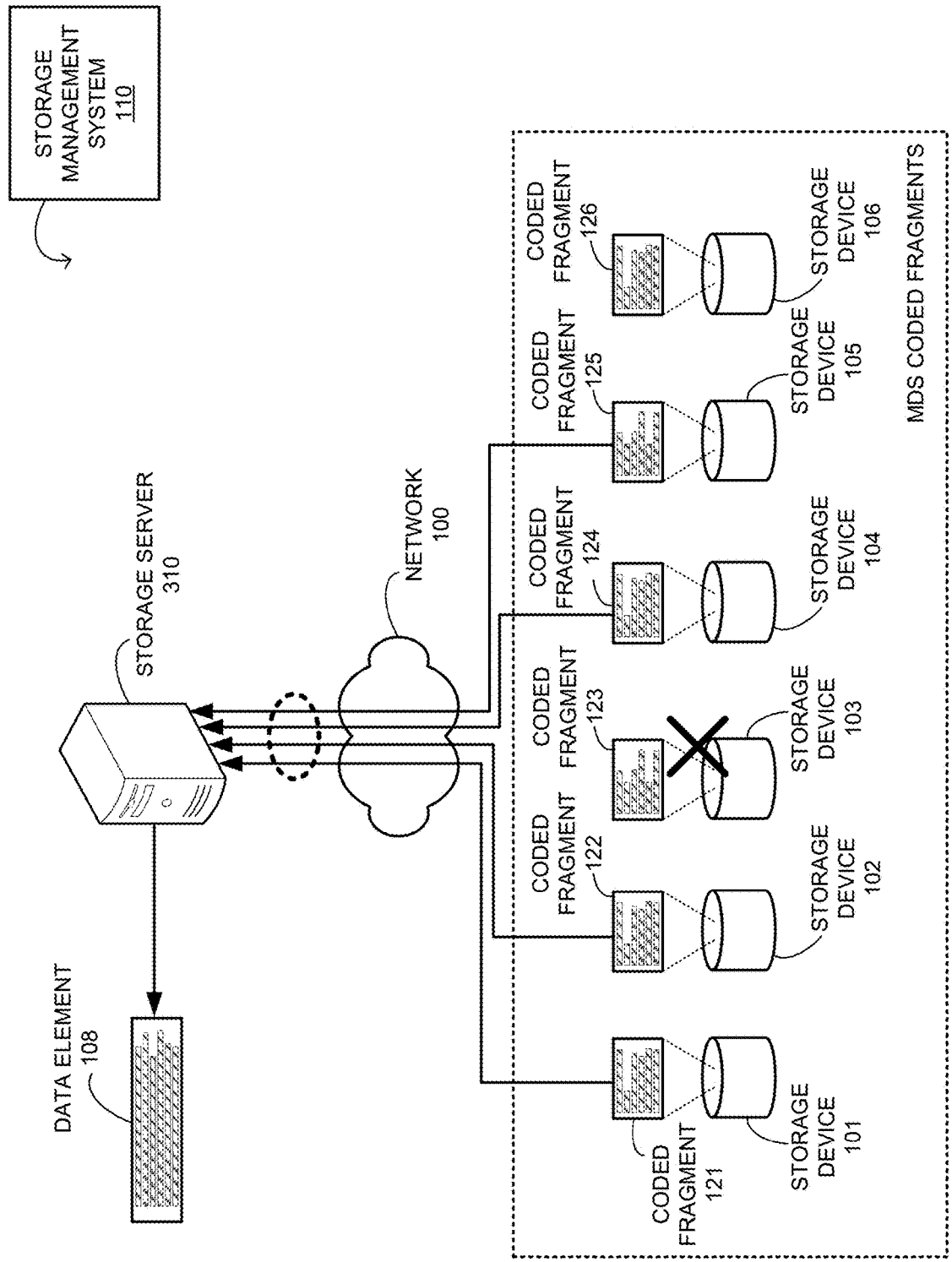
FIG. 3B illustrates an exemplary data retrieval process for erasure coding in response to an error, in accordance with an embodiment described herein.

FIG. 3B illustrates an exemplary data retrieval process for erasure coding in response to an error, in accordance with an embodiment described herein. Suppose that enhanced coded fragment 123 becomes unavailable (e.g., due to a network and/or node failure) (denoted with a cross). For example, if enhanced coded fragments 121, 122, and 123 are stored in three different cloud service providers, one of the providers becomes irresponsive and, hence, the corresponding coded fragment can become unavailable. However, server 310 can still retrieve data element 108 by obtaining other regular coded fragments. For a (6, 4) system, as long as system 110 can obtain four error-free coded fragments, system 110 can reconstruct data element 108. Hence, server 310 obtains two more coded fragments 124 and 125, and reconstructs data element 108. Similarly, if any two of enhanced coded fragments 121, 122, and 123 become unavailable, server 310 needs to obtain regular coded fragments 124, 125, and 126 to reconstruct data element 108.

Retrieval Operations

Figure 4:
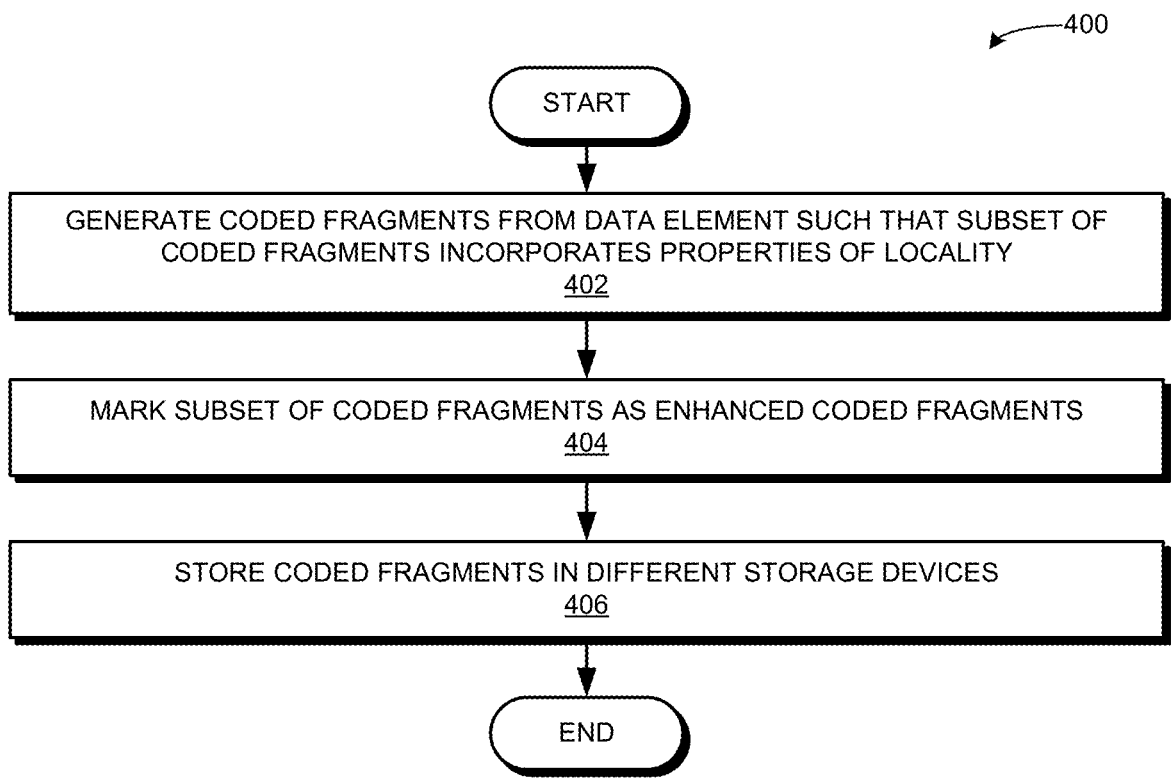
FIG. 4 presents a flowchart illustrating a method for storing a data element based on erasure coding, in accordance with an embodiment described herein.

FIG. 4 presents a flowchart 400 illustrating a method for storing a data element based on erasure coding, in accordance with an embodiment described herein. During operation, a storage management system generates coded fragments from a data element such that a subset of coded fragments incorporates the properties of locality (operation 402). The system marks the subset of coded fragments as the enhanced coded fragments (operation 404) and stores the coded fragments in different storage devices (operation 406). The storage devices can be on different servers of a cloud site or on different service providers.

Figure 5:
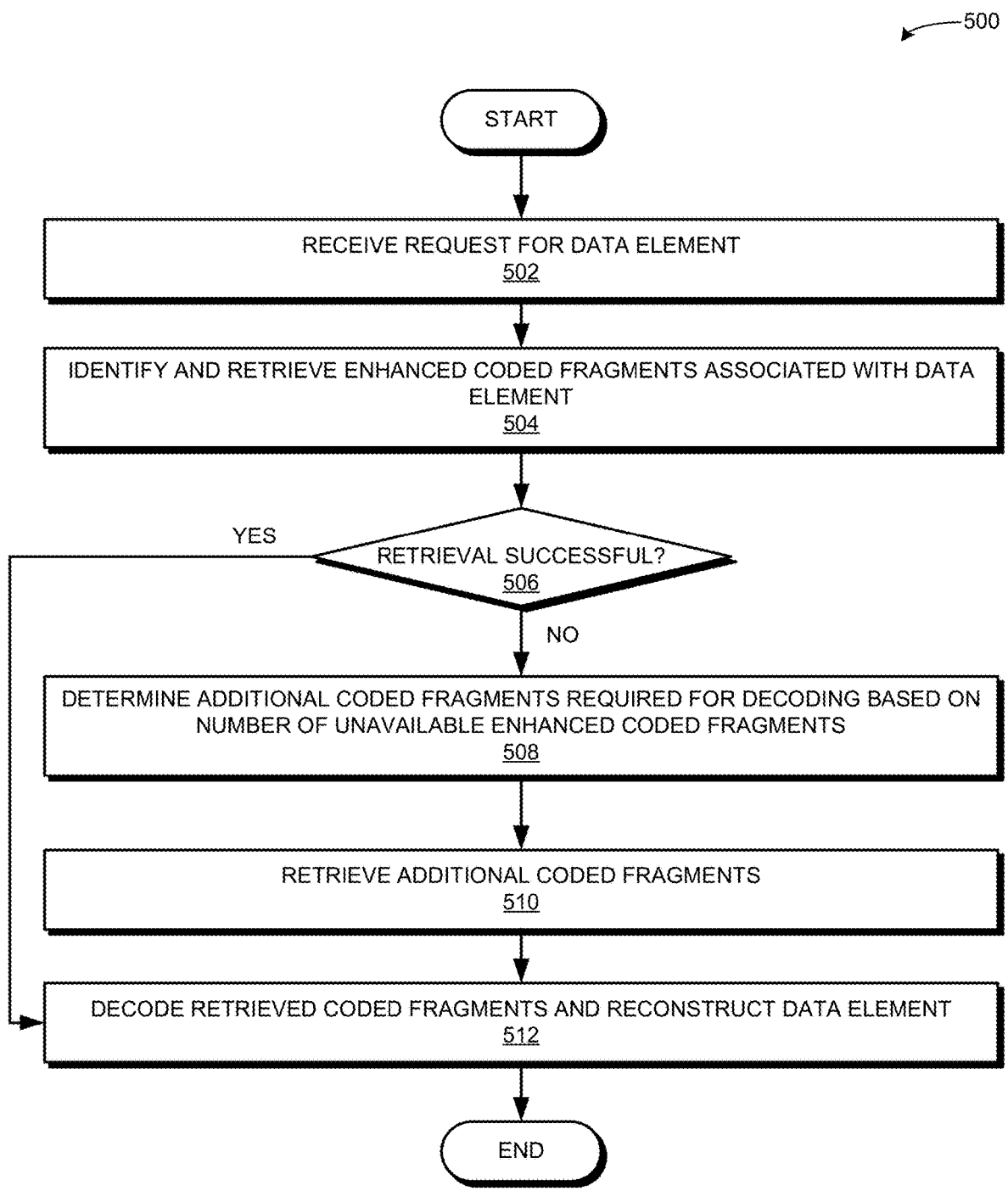
FIG. 5 presents a flowchart illustrating a method for retrieving a data element based on erasure coding, in accordance with an embodiment described herein.

FIG. 5 presents a flowchart 500 illustrating a method for retrieving a data element based on erasure coding, in accordance with an embodiment described herein. During operation, a storage server receives requests for a data element (operation 502). The server identifies and retrieves the enhanced coded fragments associated with the data element (operation 504) and checks whether the retrieval is successful (operation 506). If unsuccessful, the server determines additional coded fragments required for decoding based on the number of unavailable enhanced coded fragments (operation 508) and retrieves the additional coded fragments (operation 510). Upon successfully retrieving the enhanced coded fragments (operation 506) or retrieving the additional coded fragments needed to reconstruct the data element (operation 510), the server decodes the retrieved coded fragments and reconstructs the data element (operation 512).

Exemplary Computer and Communication System

Figure 6:
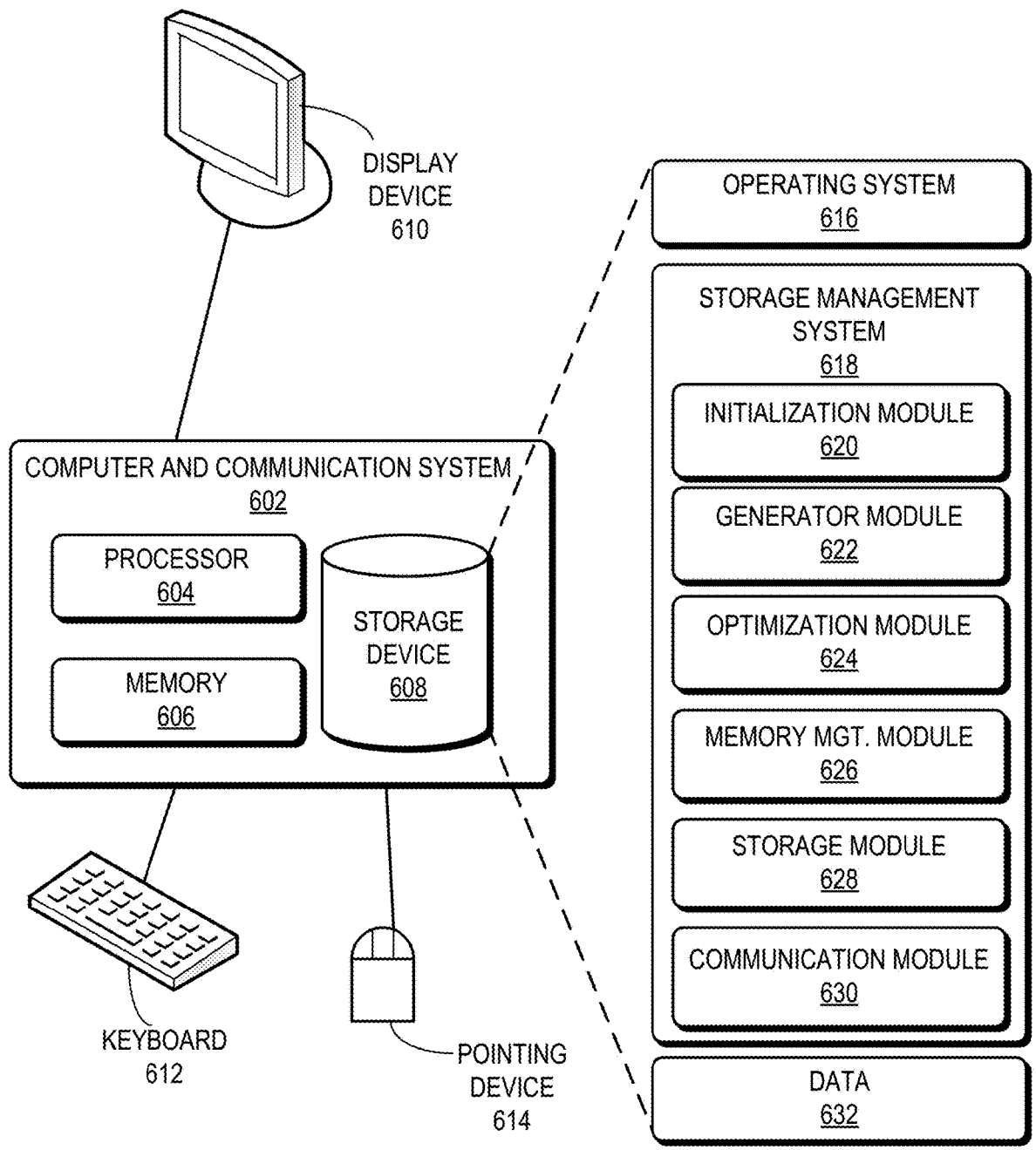
FIG. 6 illustrates an exemplary computer and communication system that facilitates erasure-coding-based data storage and retrieval, in accordance with an embodiment described herein.

FIG. 6 illustrates an exemplary computer and communication system that facilitates integrated security and numerical operation-based erasure coding, in accordance with an embodiment described herein. A computer and communication system 602 includes a processor 604, a memory 606, and a storage device 608. Memory 606 can include a volatile memory (e.g., RAM). Furthermore, computer and communication system 602 can be coupled to a display device 610, a keyboard 612, and a pointing device 614. Storage device 608 can store an operating system 616, a storage management system 618, and data 632.

Storage management system 618 can include instructions, which when executed by computer and communication system 602, can cause computer and communication system 602 to perform the methods and/or processes described in this disclosure. Storage management system 618 includes instructions for determining a generator matrix and a base equation (initialization module 620). Storage management system 618 also includes instructions for determining a set of primitive elements using the properties of locality from the generator matrix and the base equation (generator module 622).

Storage management system 618 further includes instructions for optimizing the primitive elements of the finite field such that the output structure conforms to the properties of MDS (optimization module 624). This allows system 618 to generate the output structure that conforms to both properties of locality and MDS. Storage management system 618 further includes instructions for performing realignment of the output structure in the memory such that the number of equations is further reduced, and determining a new generator matrix from the output structure (memory management module 626).

Storage management system 618 can include instructions for obtaining the encoder and decoder matrices based on the new generator matrix (storage module 628). Storage management system 618 can also include instructions for exchanging information with other devices, such as distributed storage devices (communication module 630). Data 632 can include any data that is required as input or that is generated as output by the methods and/or processes described in this disclosure.

Figure 7:
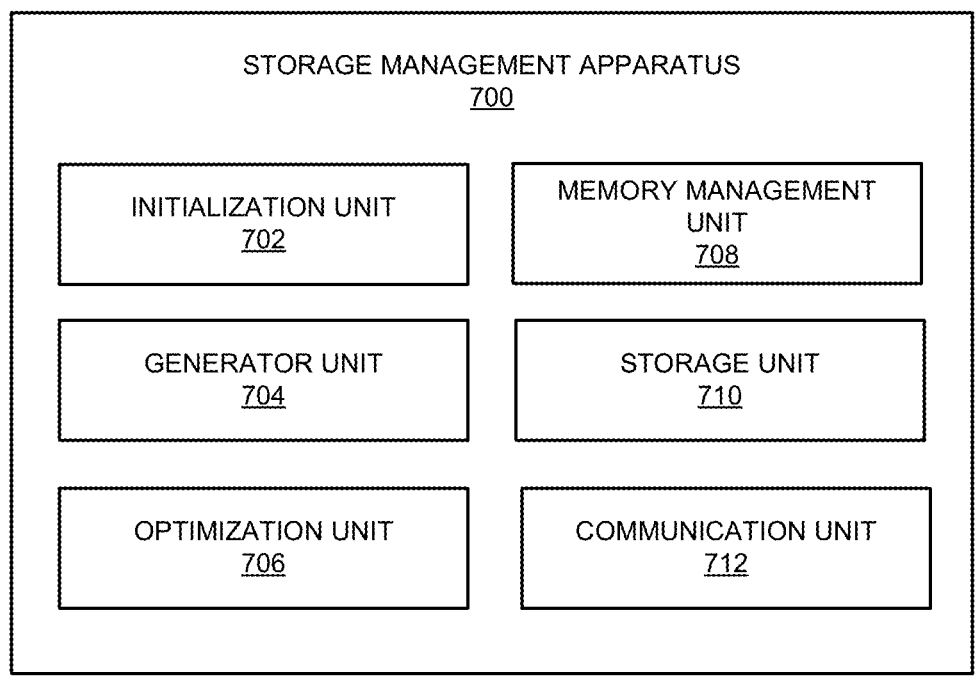
FIG. 7 illustrates an exemplary apparatus that facilitates erasure-coding-based data storage and retrieval, in accordance with an embodiment described herein.

FIG. 7 illustrates an exemplary apparatus that facilitates erasure-coding-based data storage and retrieval, in accordance with an embodiment described herein. Storage management apparatus 700 can comprise a plurality of units or apparatuses which may communicate with one another via a wired, wireless, quantum light, or electrical communication channel. Apparatus 700 may be realized using one or more integrated circuits, and may include fewer or more units or apparatuses than those shown in FIG. 7. Further, apparatus 700 may be integrated in a computer system, or realized as a separate device that is capable of communicating with other computer systems and/or devices. Apparatus 700 can comprise units 702-712, which perform functions or operations similar to modules 620-630 of computer and communication system 602 of FIG. 6, including: an initialization unit 702; a generator unit 704; an optimization unit 706; a memory management unit 708; a storage unit 710; and a communication unit 712.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for efficiently storing and retrieving data in a distributed storage system, comprising:
   determining, by a computer system, a finite field solution that conforms to both locality and maximum distance separable (MDS) properties of an erasure-coding system;
   determining a generator matrix of the erasure-coding system based on the finite field solution;
   generating, from a data element, a plurality of coded fragments based on the generator matrix of the erasure-coding system, wherein the plurality of coded fragments includes a set of enhanced coded fragments that allows reconstruction of the data element and a set of regular coded fragments that facilitates the reconstruction of the data element in conjunction with the set of enhanced coded fragments, and wherein the number of the enhanced coded fragments is fewer than a threshold number of regular coded fragments needed to retrieve the data element using the erasure-coding system; and
   providing the plurality of coded fragments for storing in storage devices of the distributed storage system.

2. The method of claim 1, wherein determining the finite field solution comprises:
   determining a set of elements of the finite field solution that conforms to the locality properties; and
   determining the finite field solution based on the set of elements such that the erasure-coding system conforms to the MDS properties.

3. The method of claim 2, wherein determining the set of elements comprises:
   obtaining a generator matrix and a base equation associated with the erasure-coding system;
   generating a set of equations based on known solutions associated with the generator matrix; and
   calculating a set of primitive elements of the finite field solution based on the base equation such that the set of primitive elements conforms to the locality properties.

4. The method of claim 3, wherein determining the set of elements further comprises:
   storing the set of primitive elements in a data structure in a memory device of the computer system; and
   realigning memory locations storing the set of primitive elements in the memory device to reduce a number of equations of the finite field solution.

5. The method of claim 1, further comprising:
   obtaining the enhanced coded fragments from storage devices storing the enhanced coded fragments; and
   in response to successfully obtaining the enhanced coded fragments, reconstructing the data element from the enhanced coded fragments.

6. The method of claim 5, further comprising:
   determining that a subset of the enhanced coded fragments is unavailable;
   obtaining a subset of the regular coded fragments from storage devices storing the subset of the regular coded fragments; and reconstructing the data element from the available enhanced coded fragments and the obtained regular coded fragments.

7. The method of claim 6, further comprising determining a number of the obtained regular coded fragments based on the subset of the unavailable enhanced coded fragments.

8. The method of claim 5, further comprising:
generating a decoder matrix, which is an inverted matrix of a sub-matrix of the generator matrix based on the enhanced coded fragments; and
obtaining the data element based on one or more matrix operations between the decoder matrix and the enhanced coded fragments.

9. A non-transitory computer-readable storage medium storing instructions that when executed by a computer cause the computer to perform a method for efficiently storing and retrieving data in a distributed storage system, the method comprising:
determining, by the computer, a finite field solution that conforms to both locality and maximum distance separable (MDS) properties of an erasure-coding system;
determining a generator matrix of the erasure-coding system based on the finite field solution;
generating, from a data element, a plurality of coded fragments based on the generator matrix of the erasure-coding system, wherein the plurality of coded fragments includes a set of enhanced coded fragments that allows reconstruction of the data element and a set of regular coded fragments that facilitates the reconstruction of the data element in conjunction with the set of enhanced coded fragments, and wherein the number of the enhanced coded fragments is fewer than a threshold number of regular coded fragments needed to retrieve the data element using the erasure-coding system; and
providing the plurality of coded fragments for storing in storage devices of the distributed storage system.

10. The computer-readable storage medium of claim 9, wherein determining the finite field solution comprises:
determining a set of elements of the finite field solution that conforms to the locality properties; and
determining the finite field solution based on the set of elements such that the erasure-coding system conforms to the MDS properties.

11. The computer-readable storage medium of claim 10, wherein determining the set of elements comprises:
obtaining a generator matrix and a base equation associated with the erasure-coding system;
generating a set of equations based on known solutions associated with the generator matrix; and
calculating a set of primitive elements of the finite field solution based on the base equation such that the set of primitive elements conforms to the locality properties.

12. The computer-readable storage medium of claim 11, wherein determining the set of elements further comprises:
storing the set of primitive elements in a data structure in a memory device of the computer; and
realigning memory locations storing the set of primitive elements in the memory device to reduce a number of equations of the finite field solution.

13. The computer-readable storage medium of claim 9, wherein the method further comprises:
obtaining the enhanced coded fragments from storage devices storing the enhanced coded fragments; and
in response to successfully obtaining the enhanced coded fragments, reconstructing the data element from the enhanced coded fragments.

14. The computer-readable storage medium of claim 13, wherein the method further comprises:
determining that a subset of the enhanced coded fragments is unavailable;
obtaining a subset of the regular coded fragments from storage devices storing the subset of the regular coded fragments; and
reconstructing the data element from the available enhanced coded fragments and the obtained regular coded fragments.

15. The computer-readable storage medium of claim 14, wherein the method further comprises determining a number of the obtained regular coded fragments based on the subset of the unavailable enhanced coded fragments.

16. The computer-readable storage medium of claim 13, wherein the method further comprises:
generating a decoder matrix, which is an inverted matrix of a sub-matrix of the generator matrix based on the enhanced coded fragments; and
obtaining the data element based on one or more matrix operations between the decoder matrix and the enhanced coded fragments.

17. A computing system for efficiently storing and retrieving data in a distributed storage system, the computing system comprising:
a processor; and
a memory coupled to the processor and storing instructions, which when executed by the processor cause the processor to perform a method, the method comprising:
determining a finite field solution that conforms to both locality and maximum distance separable (MDS) properties of an erasure-coding system;
determining a generator matrix of the erasure-coding system based on the finite field solution;
generating, from a data element, a plurality of coded fragments based on the generator matrix of the erasure-coding system, wherein the plurality of coded fragments includes a set of enhanced coded fragments that allows reconstruction of the data element and a set of regular coded fragments that facilitates the reconstruction of the data element in conjunction with the set of enhanced coded fragments, and wherein the number of the enhanced coded fragments is lower than a threshold number of regular coded fragments needed to retrieve the data element using the erasure-coding system; and
providing the plurality of coded fragments for storing in storage devices of the distributed storage system.

18. The computer system of claim 17, wherein determining the finite field solution comprises:
determining a set of elements of the finite field solution that conforms to the locality properties; and
determining the finite field solution based on the set of elements such that the erasure-coding system conforms to the MDS properties.

19. The computer system of claim 18, wherein determining the set of elements comprises:
obtaining a generator matrix and a base equation associated with the erasure-coding system;
generating a set of equations based on known solutions associated with the generator matrix; and
calculating a set of primitive elements of the finite field solution based on the base equation such that the set of primitive elements conforms to the locality properties.

20. The computer system of claim 17, wherein the method further comprises:

obtaining the enhanced coded fragments from storage devices storing the enhanced coded fragments; and in response to successfully obtaining the enhanced coded fragments, reconstructing the data element from the enhanced coded fragments.

\* \* \* \* \*